US005113174A

United States Patent [19]

Wake

[11] Patent Number: 5,113,174

[45] Date of Patent: May 12, 1992

[54] DEVICE FOR GIVING ALARM FOR FAILURE TO DRAW OUT KEY FOR VEHICLE

[76] Inventor: Kiyoyasu Wake, No. 57-1, 3-chome, Utsukushigaoka, Midori-ku, Yokohama-shi, Kanagawa-ken, Japan

[21] Appl. No.: 730,400

[22] Filed: Jul. 16, 1991

Related U.S. Application Data

[63] Continuation of Ser. No. 542,123, Jun. 22, 1990, abandoned.

[51] Int. Cl.[5] ............ B60Q 1/00

[52] U.S. Cl. ............ 340/457; 340/568; 307/10.1; 70/237

[58] Field of Search ............ 340/457, 568, 542; 307/10.1; 70/413, 237

[56] References Cited

U.S. PATENT DOCUMENTS

| | | | |
|---|---|---|---|
| 3,649,960 | 3/1972 | Severn | 340/457 |
| 3,944,762 | 3/1976 | Coleman | 340/542 X |
| 4,223,296 | 9/1980 | Kim et al. | 340/457 |
| 4,331,013 | 5/1982 | Jaulmes | 70/413 X |

FOREIGN PATENT DOCUMENTS 2082819 3/1982 United Kingdom .

*Primary Examiner*—Jin F. Ng
*Assistant Examiner*—Jeffery A. Hofsass
*Attorney, Agent, or Firm*—Edwin E. Greigg; Ronald E. Greigg

[57] ABSTRACT

This invention relates to a device for giving an alarm for failure to draw out an engine key for a vehicle. A key cylinder lock comprises an outer tubular member, and an inner tubular member rotatably provided within the outer tubular member. A magnet key having a magnet is inserted into the inner tubular member. A switch member which is turned ON when the magnet key is inserted into the inner tubular member by a power delivered from a power supply provided in the vehicle is provided in the outer tubular member. On the other hand, a door switch which is turned ON when the door of the vehicle is opened is provided. An alarm unit is connected to both the door switch and the switch member. Thus, when the door of the vehicle is opened with the magnet key being inserted into the key cylinder lock as it is, the alarm unit produces an alarm, thus to inform a driver that he forgets to draw out the key.

1 Claim, 7 Drawing Sheets

DEVICE FOR GIVING ALARM FOR FAILURE TO DRAW OUT KEY FOR VEHICLE

This is a continuation of copending application Ser. No. 07/542,123 filed on Jun. 22, 1990 now abandoned.

BACKGROUND OF THE INVENTION

This invention relates to a device for giving an alarm for failure to draw or pull out an engine key for a vehicle.

Conventionally, as the device of this kind, there is an embodiment disclosed in, e.g., Japanese Patent Application Laid Open No. 159159/88.

This embodiment is essentially constructed to form a series circuit by a door switch which is turned ON when the door is opened, a key switch which is turned ON when the engine key is inserted into the key cylinder, and an alarm unit, thus to supply a power to the series circuit by a drive power supply of a door-lock actuator which is activated in response to a door lock-operation.

However, the above-mentioned embodiment has the problems recited below.

(1) By a relatively simple construction utilizing an existing circuit, an alarm for failure to draw out an engine key for a vehicle can be given. However, even if a procedure is taken to simply open the door with the engine key being inserted into the key cylinder, the alarm unit does not produce an alarm. To provide an alarm, the door lock-operation must be necessarily conducted.

Accordingly, when a driver has closed the door without carrying out the door-lock operation, there are instances where there may occur failure to draw out an engine key.

(2) The engine key is of an ordinary type in which the key body includes a plurality of engagement portions.

Accordingly, reproduction is easy.

Further, the key cylinder lock may be also subjected to picking.

Therefore, an intention of preventing a failure to draw out an engine key as well as an intention of indirectly preventing burglary of a vehicle cannot be sufficiently attained.

SUMMARY OF THE INVENTION

With the drawbacks with the prior art in view, this invention contemplates providing a device for giving an alarm for failure to draw out a key for a vehicle which can completely prevent a driver from being away from a vehicle with the driver forgetting to draw out a key, wherein it is very difficult to reproduce a duplicate key of a key used in this device and it is also very difficult to conduct picking of a key cylinder lock when this device is employed, whereby it can be expected to prevent a vehicle from being stolen. This invention further contemplates providing a device for giving an alarm for failure to draw out a key for a vehicle which can be easily installed and put into practice, and which has excellent durability.

To achieve the above-mentioned object, a device vehicle, characterized by the provision of a switch member provided in a key cylinder lock and turned ON when a magnet key as an engine key is inserted into the key cylinder lock by power from a power supply provided in the vehicle, a door switch turned ON when the door is opened, and an alarm unit operative to produce an alarm when the door of the vehicle is opened under the state where the magnet key is inserted into the key cylinder lock as it is on the basis of the operating states of the switch member and the door switch.

BRIEF DESCRIPTION OF THE DRAWINGS

In the accompanying drawings:

FIG. 1 is a model view showing an arrangement of an alarm device according to one embodiment of this invention, FIG. 2 is a block diagram showing an electrical connection of the alarm device of FIG. 1, FIGS. 3 to 6 are schematic explanatory views showing essential parts of this invention, respectively, FIGS. 7 and 8 are explanatory views showing switch members of this invention, respectively, and FIGS. 9 to 14 are explanatory views showing a different embodiment of this invention.

DESCRIPTION OF THE PREFERRED EMBODIMENTS

Preferred embodiments of this invention will be described in detail with reference to the attached drawings.

Figure 1:
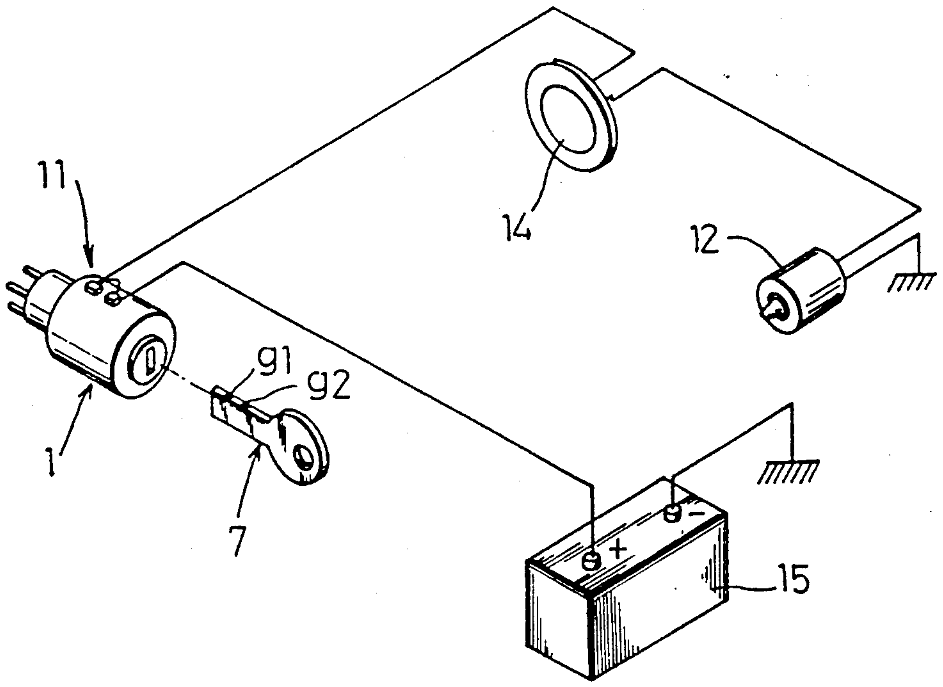
FIGS. 1 to 14 show embodiments of this invention. More particularly.

FIG. 1 is a schematic view showing, in a model form, an embodiment of this invention.

In this figure, reference numeral 1 denotes a key cylinder lock constituting a part of an ignition coil or a key switch for a switch provided at a handle column of an automotive vehicle. This key cylinder lock 1 is constituted, e.g., as shown in FIGS. 3 to 6. Namely, reference numeral 2 denotes an outer tubular member having a predetermined length. An outer hole 3 and an inner hole 4 communicating with each other and intersecting with each other are provided in the outer tubular member 2 from a suitable portion of the outer circumferential portion toward the radial direction. In outer hole 3 and inner hole 4 are formed at a required interval.

Figure 3:
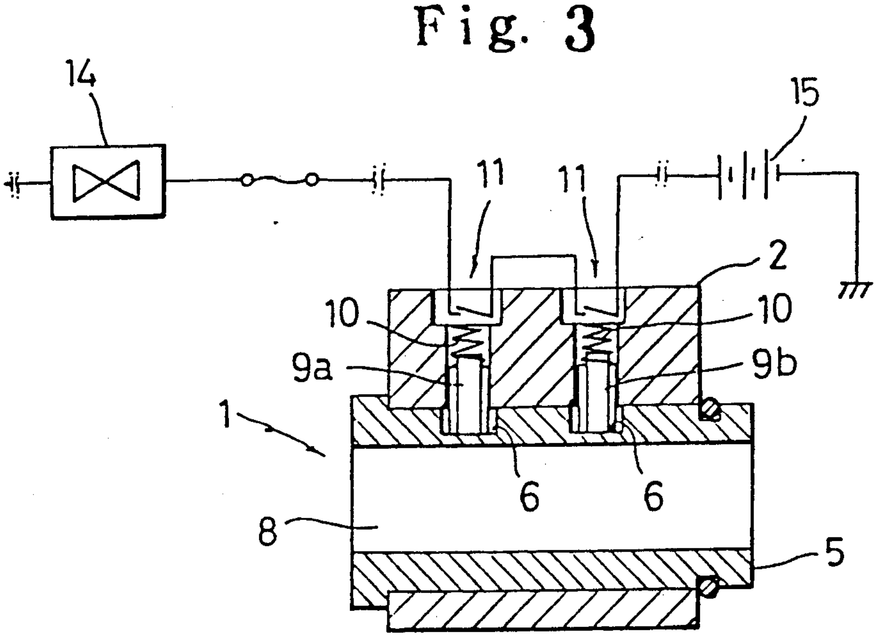

Reference numeral 5 denotes an inner tubular member rotatably received over a predetermined angular range within the outer tubular member 2. Grooves 6 of a suitable size are formed at portions corresponding to the above-mentioned penetration holes of the outer circumferential portion of the inner tubular member 5, respectively. At the central portion of the inner tubular member 5, a key hole 8 corresponding to a key body 7*a* of a magnetic key 7 as an engine key shown in FIG. 3 is opened.

Figure 5:
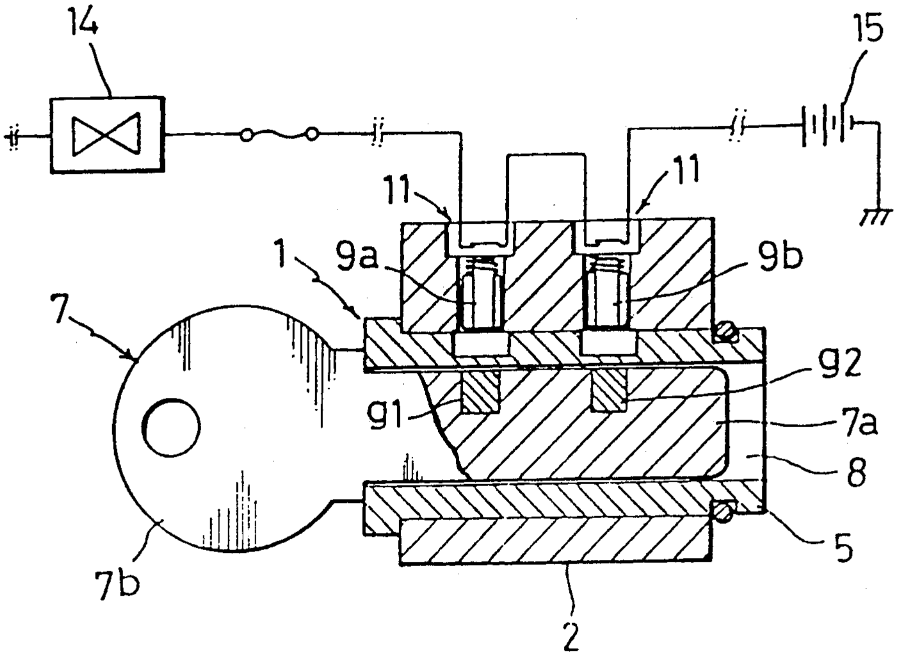

Reference numeral 9 denotes movable obstruction elements each accommodated within both the inner hole 4 of the outer tubular member 2 and the groove 6 of the inner tubular member 5. In this embodiment, a plurality of magnet pin tumblers 9*a* and 9*b* are used. Each movable obstruction element is biased toward the groove 6 by a spring member 10 having a relatively weak spring force fitted into the inner hole 4 of the outer tubular member in a locked state or before the magnet key 7 is inserted. This magnetic key 7 is comprised of a key body 7*a* inserted into the key hole and a holding portion 7*b* integrally formed with the key body 7*a*. As shown in FIG. 5, a plurality of magnets g1 and g2 are embedded at the upper side portion of the key body 7*a* with a predetermined spacing therebetween. The polarities of these plural magnets g1 and g2 may be arbitrarily combined.

Figure 7:
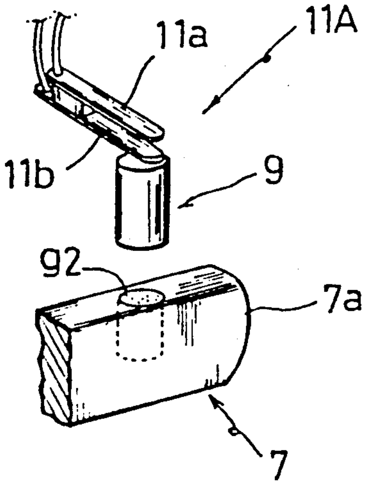
Figure 8:
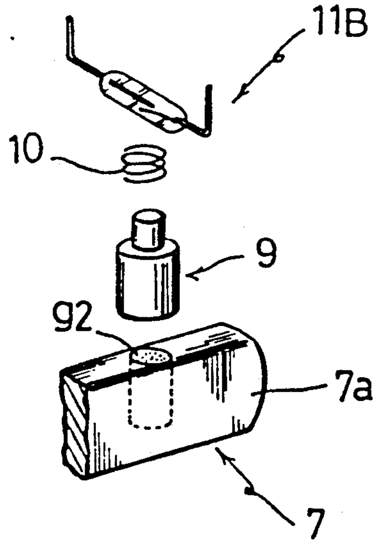
Figure 9:
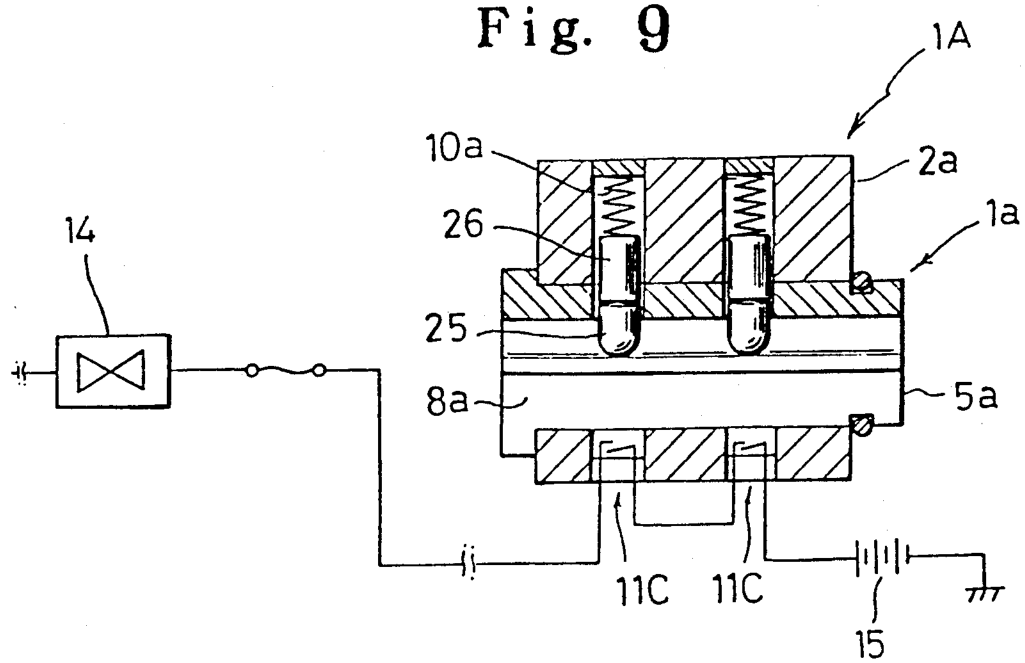
Figure 10:
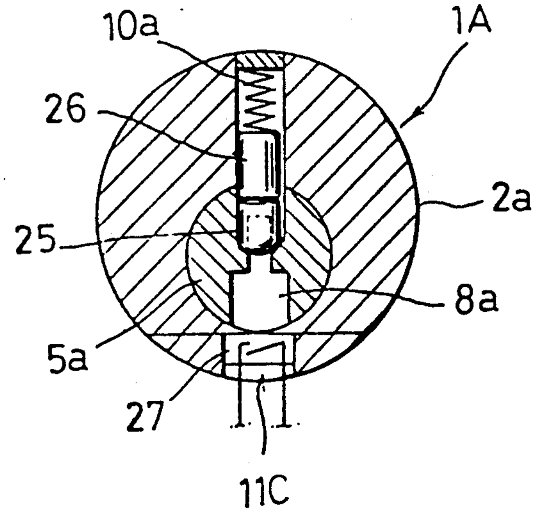
Figure 11:
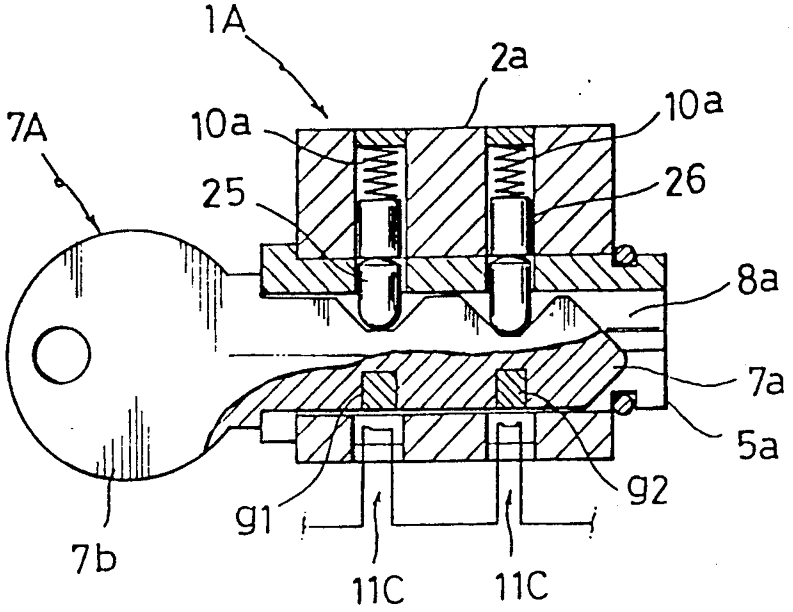
Figure 12:
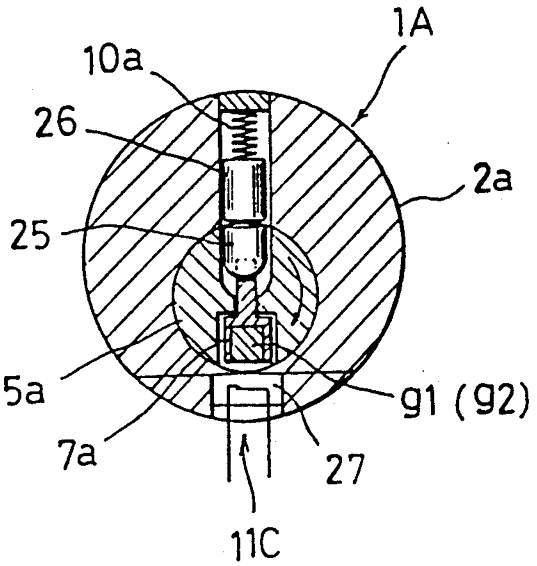

Reference numeral 11 denotes a switch member which is provided in the key cylinder lock 1 of the key switch for an ignition switch, and which is opened and closed in dependency upon the insertion into the key hole of the magnet key 7 and the detachment therefrom. In this embodiment, as shown in FIG. 5, for this purpose, there is provided a magnetic responsive switch which detects that the movable obstruction element 9 jumps up against the spring force of the spring member 10 from the groove 6 of the inner tubular member by insertion of the magnet key 7 and becomes close to the switch, whereby the magnetic responsive switch is brought into a closed state. As the magnetic responsive switch 11, there may be used, e.g., a switch member 11A comprising a fixed contact piece 11*a* as a fixed contact and a movable contact piece 11*b* as a movable contact as shown in FIG. 7 or a magnetic responsive lead switch 11B as shown in FIG. 8.

In this embodiment, switch members 11 using a magnetic responsive switch are suitably assembled into a plurality of outer holes 3 of the outer tubular member 2 as shown in FIGS. 3 to 6, respectively. Respective switch members 11 and 11 are connected in series and are protected by a cover member (not shown).

Figure 2:
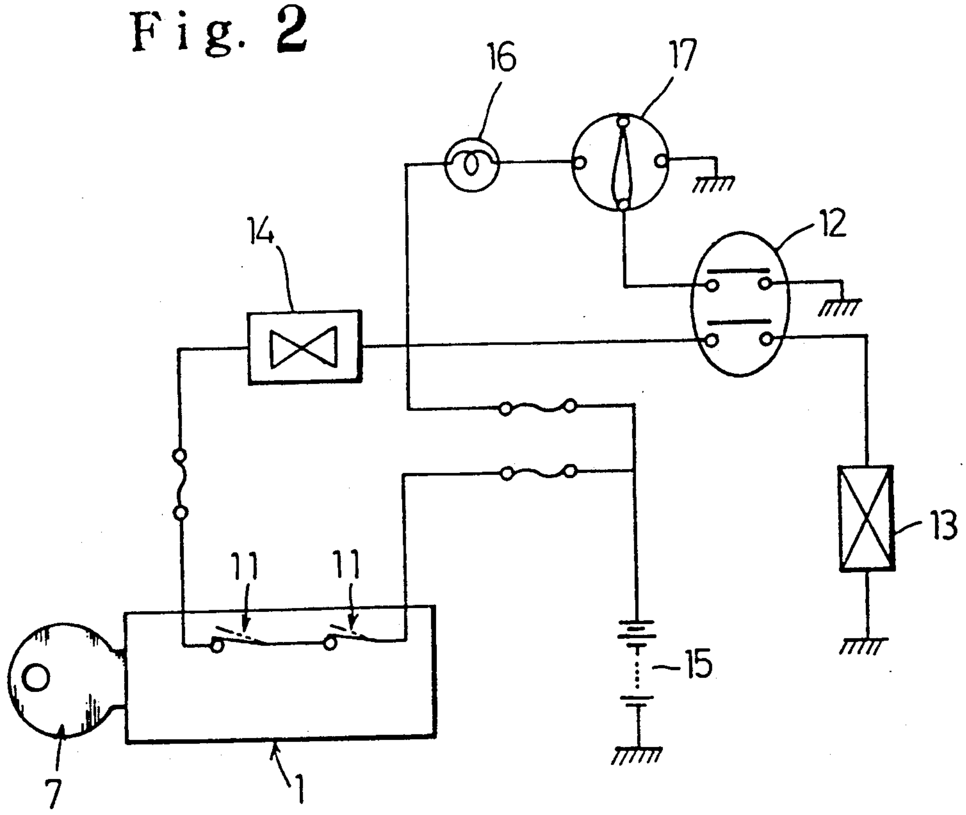

Turning to FIGS. 1 and 2, reference numeral 12 denotes a door switch which is turned ON when the door of a vehicle is opened. An electrical load 13 is connected to this door switch 12.

Reference numeral 14 denotes an alarm unit such as a buzzer connected between the switch members 11 of the key cylinder lock 1 and the door switch 12. In this embodiment, this alarm unit 14 is energized using a battery 15 mounted in a vehicle as a power supply when both the switch member 11 and the door switch 12 are turned ON to produce an alarm. Additionally, reference numeral 16 denotes a room lamp connected to the battery 15 through the door switch 12 and a room lamp switch 17.

Figure 4:
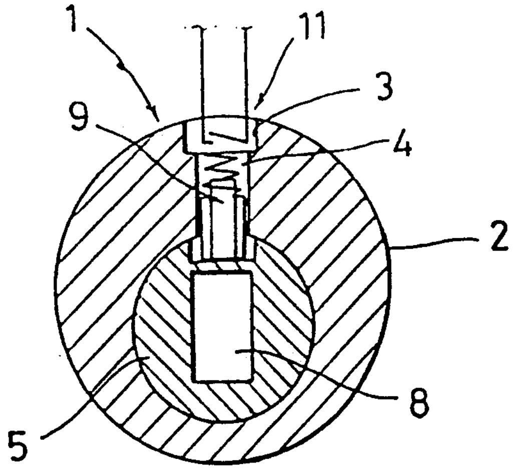

In the above construction, as shown in FIGS. 3 and 4, before the magnet key 7 is inserted into the key cylinder lock 1, a plurality of magnetic pin tumblers 9*a* and 9*b* serving as a movable obstruction element are thrust by the spring members 10, so they are positioned within the grooves 6 and a plurality of magnetic responsive switches 11 each serving as a switch member are in a closed state, respectively.

Figure 6:
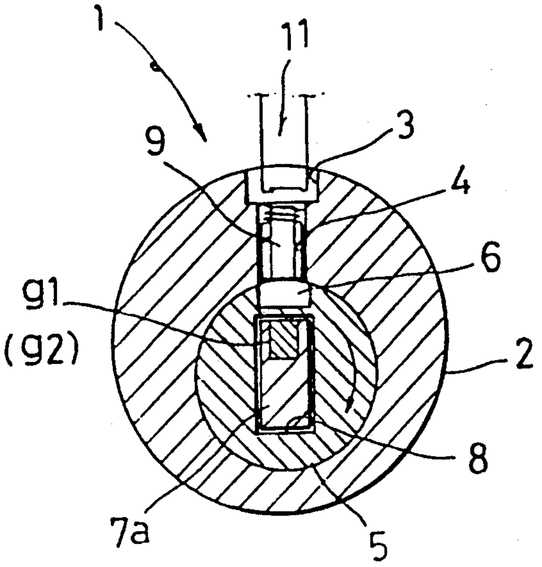

On the other hand, as shown in FIGS. 5 and 6, the key cylinder lock 1, magnetic forces of the magnets g1 and g2 embedded in the magnet key 7 are exerted on corresponding magnetic pin tumblers 9*a* and 9*b* having the same polarity, respectively. As a result, the magnetic pin tumblers 9*a* and 9*b* jump upwardly against the spring force of the spring members 10 from the grooves 6, and become close to the magnetic responsive switches, respectively. Responding to this, respective magnetic responsive switches 11 are brought into a closed state.

It is now assumed that a driver has opened the door under the state where he forgets to draw out the magnet key 1 from the key cylinder lock 1. This allows the door switch 12 to be turned ON. As a result, a current from the battery 15 mounted in the vehicle flows in the alarm unit 14, the door switch 12 and the electrical load 13 via a plurality of switch members 11 and 11. Thus, the alarm unit 14 produces an alarm as long as both switches 11 and 12 are in an ON state.

A different embodiment of this invention will now be described. The same or similar reference numerals are attached to the same parts as those of the above-described embodiment of this invention, respectively, and their repetitive explanation will be omitted.

In the embodiment shown in FIGS. 9 to 14, the structure of a key cylinder lock 1A mainly differs from that of the above-described embodiment of this invention.

Namely, this key cylinder lock 1A essentially comprises an outer tubular member 2*a*, an inner tubular member 5*a* rotatably provided within the outer tubular member 2*a*, and driver pins 26 adapted to thrust movable pins 25 provided in the outer tubular member 2*a* and provided in the inner tubular member 5*a* by spring members 10*a* in a radial direction of the key hole 8*a* for a magnet key 7A at all times. At suitable portions of thin thickness of the outer tubular member 2*a*, there are formed a plurality of penetration holes 27 adapted so that a plurality of magnetic responsive switches 11*c* each serving as a switch member can be fitted.

Also in the above-mentioned construction, when the magnet key 7A is inserted into the key hole 8*a* of the key cylinder lock 1A, respective magnetic responsive switches 11*c* and 11*c* are in an ON state.

Accordingly, when the door is opened, the door switch is turned ON. As a result, in the same manner as in the above-described embodiment, the alarm unit produces an alarm, thereby making it possible to prevent failure to draw out a key.

Figure 13:
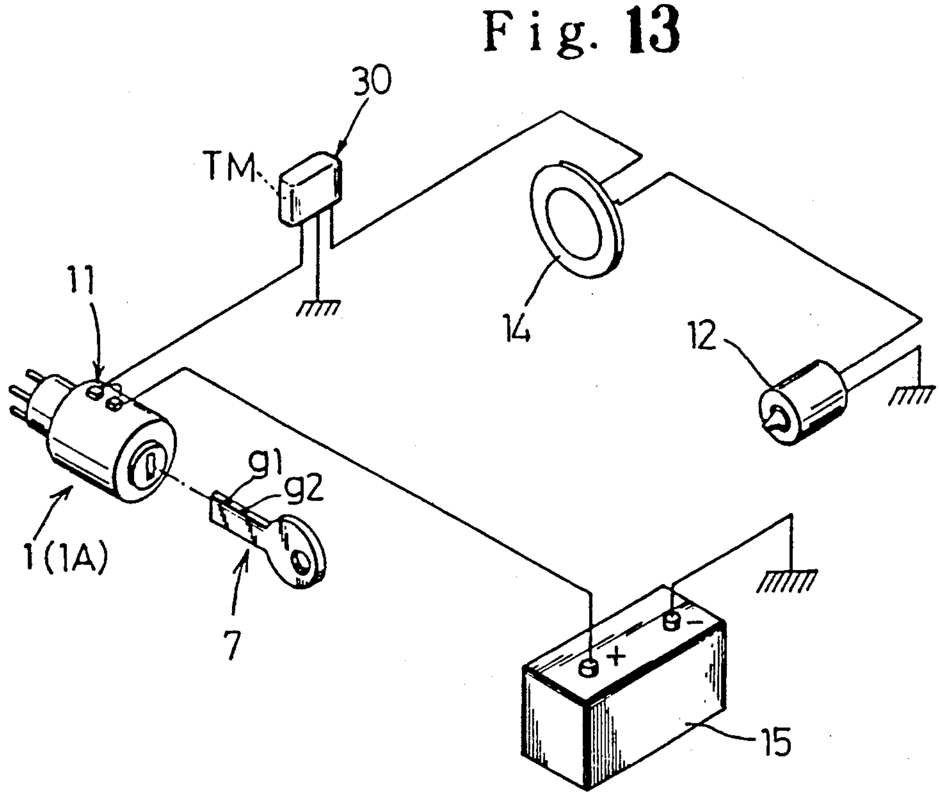
Figure 14:
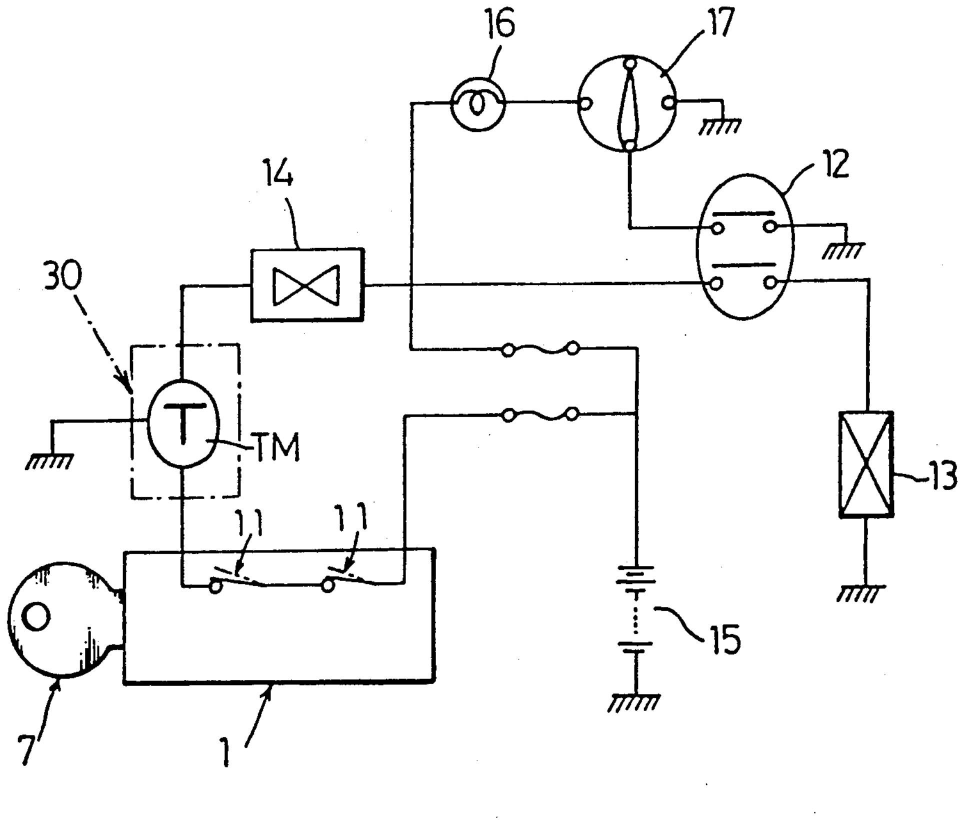

The modified embodiment shown in FIGS. 13 and 14 mainly differs from the above-described embodiment in that a timer TM is newly provided.

Namely, between a plurality of switch members 11 and 11 of the key cylinder lock 1 (1A) and the alarm unit 14, there is provided a controller 30 including a timer TM for allowing the alarm unit to be operative for a fixed time.

In the above-mentioned construction, when the switch members 11, 11 and the door switch 12 are turned ON, a current from the battery 15 mounted in the vehicle flows in the alarm unit 14, the door switch 12, and the electrical load 13. At this time, that current is to flow in the alarm unit 14 only for an output time of the timer TM. Thus, an alarm is produced only this time period.

As is clear from the foregoing description, this invention can provide the advantages recited below.

(1) Since the magnet key adapted to be inserted into the key cylinder lock for vehicle and the switch member provided in the key cylinder lock, which is turned ON in response to insertion of the magnet key, there is no possibility that the magnet key is damaged and there is little possibility that the mechanical key cylinder lock is out of order. Accordingly, there is little possibility that the alarm unit fails to produce an alarm by damage of the magnet key or trouble of the key cylinder lock.

(2) Since a power supply signal delivered from the power supply through the switch member of the key cylinder lock can be used as information, an alarm unit, etc. is connected to an existing circuit for a door switch which is turned ON when the door is opened, thereby making it possible to easily put this alarm device into practice.

(3) Since it is extremely difficult to reproduce a duplicate key of the magnet key on the market, and it is also very difficult to conduct picking of the key cylinder lock 1 (1A), burglar proof effect of a vehicle can be also expected.

What is claimed is:

1. A device for giving an alarm for failure to draw out a key for a vehicle, comprising:

a key cylinder lock for the vehicle including an outer tubular member having axially spaced penetrating holes (3, 4) therein, and an inner tubular member rotatably provided within said outer tubular member and having grooves (6) therein corresponding with said holes (3, 4) in said outer tubular member, a plurality of magnet pin tumbler inserts each serving as a movable obstruction element accommodated within both the holes (3, 4) of the outer tubular member and the grooves (6) of the inner tubular member, a switch member provided in each hole (3, 4) in said outer tubular member, which switch member is turned on by said magnet tumbler inserts when a magnet key is inserted into a keyhole (8) in said inner tubular member in which the turned on switch member completes an electrical circuit with a power supply delivered from a battery mounted in said vehicle, a door switch in said electrical circuit which is turned on when a door of said vehicle is opened, and an alarm unit connected to both said door switch and said switch member in each hole and operative to produce an alarm when the door of the vehicle is opened under a condition where the magnet key is inserted within the key hole at the time the door is opened.

* * * * *